Patented June 14, 1949

2,472,913

UNITED STATES PATENT OFFICE 2,472,913

AZOMETHINE DYES FROM ACYLACETA-MIDOBENZALDEHYDE ACETALS

David Malcolm McQueen, Wilmington, Del., assignor to E. I. du Pont de Nemours & Company, Wilmington, Del., a corporation of Delaware No Drawing. Application April 17, 1948,
Serial No. 21,761

6 Claims. (Cl. 260—338)

This invention relates to new organic chemical compounds and more particularly to such compounds which have the properties of dyes. Still more particularly it relates to novel azomethine dyes.

An object of this invention is to provide a new class of organic compounds which have the properties of dyes. A more specific object is to provide new azomethine dyes from a class of novel acylacetamidobenzaldehyde acetals. Another object is to provide a new class of dyes which have general utility in the textile arts. Still other objects will be apparent from the following description of the invention.

The novel chemical compounds of this invention are m - (acyl-[4'-(dialkylamino)phenyl-iminoacetamido)-benzaldehyde acetals of alkanols of 1 to 4 carbon and 1,2- and 1,3-alkanediols of 2 to 4 carbon atoms. They may be represented by the general formula:

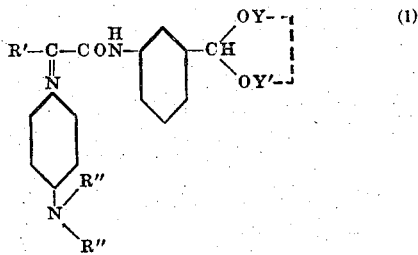

wherein R' is a carboxylic acid acyl radical of not more than 11 carbon atoms ((R—CO—) where R is the residue of an acyl radical) which is directly connected to the acyclic carbon atom

by the carbon atom of the carbonyl group of the acyl radical, R'' is an alkyl radical of 1 to 4 carbon atoms and Y and Y' alone are alkyl radicals of 1 to 4 carbon atoms and when joined constitute a saturated aliphatic divalent hydrocarbon radical of 2 to 4 carbon atoms where 2 to 3 atoms are in the chain between the two oxygen atoms.

In the above formula, R' may be a fatty acid acyl radical of 1 to 11 carbon atoms, e. g.,

can be acetyl, propionyl, and decanoyl; or other acyl radicals such as toluoyl, ethylbenzoyl, benzoyl, α-naphthoyl, β-naphthoyl, furoyl, carbalkoxy radical etc., but R is preferably a hydrocarbon radical; Y and Y' may be methyl, ethyl, n-propyl, isopropyl, n-butyl and isobutyl or together may constitute the radical of a 1,2- or 1,3-glycol of 1 to 4 carbon atoms, e. g., dimethylene or trimethylene. Y and Y' together are preferably —CH₂CH₂— and

is preferably acetyl or benzoyl.

The novel compounds of the above formula can be prepared by reacting an acetal of the formula:

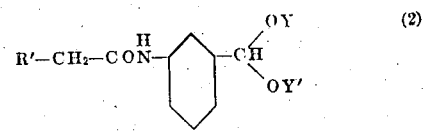

wherein R' and Y and Y' have the same significance as in Formula 1 with a p-aminodialkylaniline, e. g., p-aminodiethylaniline, in the presence of a mild oxidizing agent under alkaline conditions, e. g., exposed light-sensitive silver halide, or potassium ferricyanide. The dye which separates or precipitates out can be filtered, washed and dried, and purified by extraction and recrystallization.

The acetals of Formula 2 can be advantageously prepared by reacting an acylacetic acid ester, e. g., ethyl acetoacetate or ethyl benzoylacetate, with the m-aminobenzaldehyde acetal, e. g., the ethylene glycol acetal, after the manner described in copending McQueen application Serial No. 667,126, filed May 3, 1946, now Patent No. 2,464,597. In the preferred method of preparing such acetals as described in said application, a beta-ketoester of a low molecular weight monoalkanol, e. g., ethyl acetoacetate, and an inert high-boiling solvent, e. g., chlorobenzene or xylene, and a small amount of an alkaline catalyst, e. g., pyridine, 20% aqueous NAOH, etc., are heated to a temperature of 100° to 140° C. The acetal of meta-aminobenzaldehyde, for example, m-aminobenzaldehyde ethylene glycol acetal, is then added. The ethyl alcohol formed in the condensation reaction is distilled out of the mixture over a period of two to four hours. After cooling, the reaction mixture is poured into water containing a sufficient amount of sodium hydroxide to dissolve the m-acetoacetamidobenzaldehyde acetal. The water layer is separated, washed with a water-immiscible solvent, such as ether, and is saturated with carbon dioxide. The m-acetoacetamidobenzaldehyde acetal separates as a solid or, in some cases, an oil. The material may be further purified by repeated extractions or crystallization from suitable solvents.

The m-aminobenzaldehyde acetals used as starting materials may be prepared in any suitable fashion; for example, by the method described in J. Chem. Soc., 121, 76 (1922). However, the preferred method of preparing m-aminobenzaldehyde acetals involves the acetalization of m-nitrobenzaldehyde followed by catalytic reduction with hydrogen.

This invention is further illustrated by the following example in which parts are by weight.

*Example*

A solution of 6.22 parts of m-(benzoylacetamido)benzaldehyde ethylene glycol acetal having a melting point of 101 to 102° C. in 200 parts of water containing 6.5 parts of sodium hydroxide is added to a solution of 4 parts of p-aminodiethylaniline hydrochloride in 150 parts of water. To this is added successively 18 parts of ammonium bromide in 50 parts of water and 28 parts of silver nitrate in 30 parts of water and the solution stirred for 30 minutes while being exposed to light. The yellow azomethine dye which forms is collected on a filter and washed well with water and dried. This crude dye mixture is extracted with methylene chloride and the extract concentrated to about 75 parts and 150 parts of petroleum ether are added to it. An oily, yellow dye separates and is dried to obtain a dark brown powder, soluble in benzene, ether and alcohol. The yield is 4.5 parts of dye melting at 54–56° C. This dye is purified by chromatographic adsorption by passing a benzene solution through a column of alumina. By washing with benzene containing 2 to 10% of methyl acetate, several bands separate, the first of which is a light yellow impurity, the second being the desired yellow dye, and the third a purple impurity. The middle fraction is isolated and the solvent removed to obtain the pure dye melting at 47–48° C. and having the formula

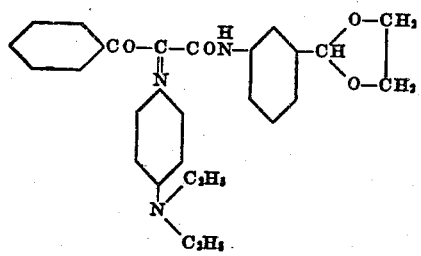

Other dyes can be prepared by substituting for the m-(benzoylacetamido)benzaldehyde ethylene glycol acetal other m-(acylacetamido)benzaldehyde ethylene glycol acetals including m-(acetoacetamido)benzaldehyde ethylene glycol acetal, m-(furoylacetamido)benzaldehyde ethylene glycol acetal, m-($\alpha$-picolinylacetamido)benzaldehyde ethylene glycol acetal, m-(o-anisoylacetamido)benzaldehyde ethylene glycol acetal, which can be prepared after the manner described above and in application Serial No. 667,126. The corresponding dimethyl, diethyl, di-n-propyl, diisopropyl, diisobutyl, di-n-butyl, 1,2-propylene glycol, and 1,3-butylene glycol acetals of the above can be used in like manner.

In place of the p-aminodiethylaniline hydrochloride described above, there may be substituted p-aminodimethylaniline hydrochloride, p-aminodipropylaniline hydrochloride, or p-aminodibutylaniline hydrochloride. The sulfates and other salts can be used, if desired.

The dyes of this invention are useful as coloring materials for textiles. They may be applied to cotton, viscose rayon, wool, silk or nylon fabrics by first reducing to the soluble form by methods generally employed for vat colors followed by reoxidation in the impregnated fabric with air or mild oxidizing agents. For example, these colors are produced by first reducing the dye in aqueous suspension to the leuco form with sodium hydrosulfite and alkali using procedures normally employed for vat dyes. Then the textile fabric is immersed in the dyebath at 80–90° C. for periods up to one hour or longer. It is then removed, rinsed and oxidized in 0.5% aqueous potassium bichromate solution. In this manner brilliant yellow colors are obtained on the fabric having excellent fastness to washing.

Although the vat process involving reduction is the preferred method of applying these dyes to textile fibers to achieve good penetration of color, they can also be applied directly, i. e., without prior reduction. This method is particularly applicable to the utilization of these dyes as throwster colors.

As many widely different embodiments of this invention can be made without departing from the spirit and scope thereof, it is to be understood that the invention is not to be limited except as defined by the claims.

What is claimed is:

1. The compounds taken from the group consisting of those of the formula:

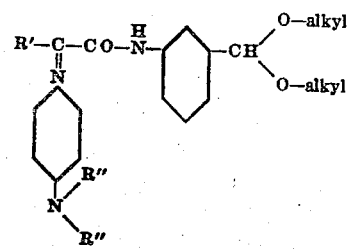

and

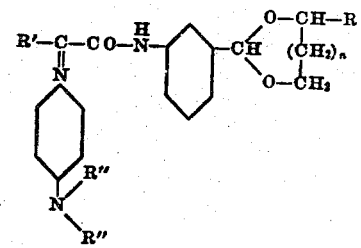

where R′ is a carboxylic acid acyl radical of 2 to 11 carbon atoms, R′′ is an alkyl radical of 1 to 4 carbon atoms, alkyl contains 1 to 4 carbon atoms, R is taken from the group consisting of hydrogen and methyl and $n$ is a number taken from the group consisting of 0 and 1.

2. The compounds of the general formula:

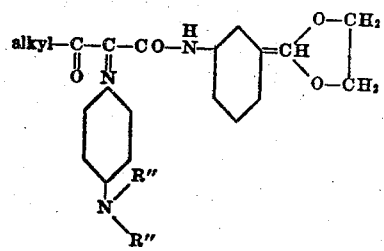

where alkyl contains 1 to 10 carbon atoms and R′′ is an alkyl radical of 1 to 4 carbon atoms.

3. The compounds of the formula:
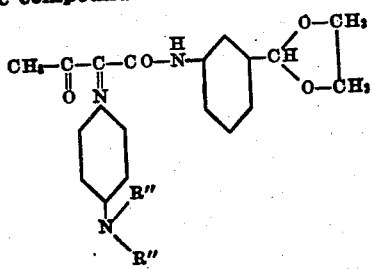
where R″ is an alkyl radical of 1 to 4 carbon atoms.
4. The compound of the formula:
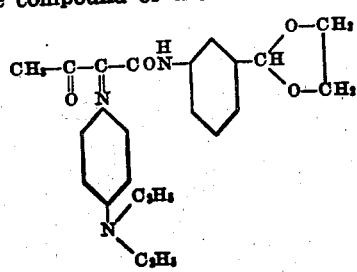
5. The compounds of the formula:
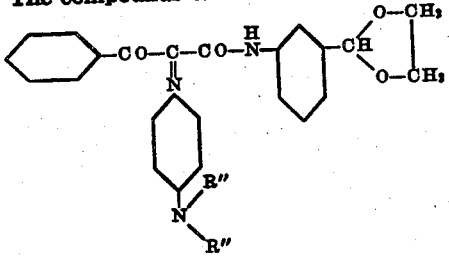
where R″ is an alkyl radical of 1 to 4 carbon atoms.
6. The compound of the formula:
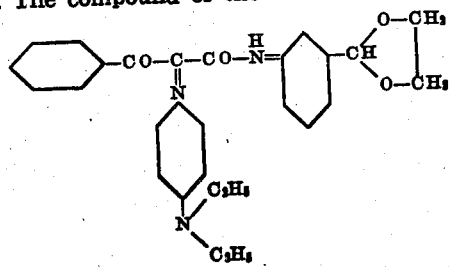
DAVID MALCOLM McQUEEN.
No references cited.

Certificate of Correction

Patent No. 2,472,913.

June 14, 1949.

DAVID MALCOLM McQUEEN

It is hereby certified that errors appear in the printed specification of the above numbered patent requiring correction as follows:

Column 4, lines 63 to 68, inclusive, claim 2, for that portion of the formula reading

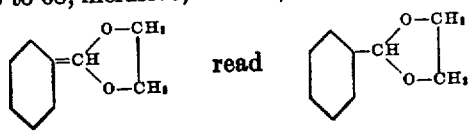 read 

column 6, lines 16 to 20 inclusive, claim 6, for read and that the said Letters Patent should be read with these corrections therein that the same may conform to the record of the case in the Patent Office.

Signed and sealed this 15th day of November, A. D. 1949.

[SEAL]

THOMAS F. MURPHY,
*Assistant Commissioner of Patents.*